US008896901B2

(12) United States Patent
Sugimoto et al.

(10) Patent No.: US 8,896,901 B2
(45) Date of Patent: Nov. 25, 2014

(54) ELECTRO-OPTIC DEVICE AND ELECTRONIC APPARATUS

(71) Applicant: Seiko Epson Corporation, Tokyo (JP)

(72) Inventors: Yohei Sugimoto, Fujimi-machi (JP); Atsushi Ito, Fujimi-machi (JP); Ryosuke Yamasaki, Chino (JP); Akihide Haruyama, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/067,766

(22) Filed: Oct. 30, 2013

(65) Prior Publication Data

US 2014/0126035 A1    May 8, 2014

(30) Foreign Application Priority Data

Nov. 5, 2012    (JP) .................................. 2012-243328

(51) Int. Cl.
*G02F 1/137*    (2006.01)
*G02F 1/1335*    (2006.01)

(52) U.S. Cl.
CPC .............. *G02F 1/133502* (2013.01); *G02F 2001/133562* (2013.01); *G02F 2001/133565* (2013.01)
USPC ..................................................... 359/245

(58) Field of Classification Search
CPC .............. G02F 1/133502; G02F 2001/133562; G02F 2001/133565
USPC ........... 359/245–254, 265–275; 345/105, 107
See application file for complete search history.

(56) References Cited

U.S. PATENT DOCUMENTS

| 7,914,883 | B2 | 3/2011 | Noguchi et al. |
| 8,253,873 | B2 | 8/2012 | Sasaki et al. |
| 2010/0277786 | A1 * | 11/2010 | Anderson et al. ............. 359/247 |
| 2013/0107181 | A1 | 5/2013 | Eguchi |

FOREIGN PATENT DOCUMENTS

| JP | 04-154647 A | 5/1992 |
| JP | 06-102499 A | 4/1994 |
| JP | 09-197102 A | 7/1997 |
| JP | 2006-346878 A | 12/2006 |
| JP | 2007-178774 A | 7/2007 |
| JP | 2009-058913 A | 3/2009 |
| JP | 2013-097228 A | 5/2013 |

OTHER PUBLICATIONS

Xing Yan et al., Refractive-Index-Matched Indium—Tin—Oxide Electrodes for Liquid Crystal Displays, Japanese Journal of Applied Physics 48, 2009, p. 120203-1-120203-3.

* cited by examiner

*Primary Examiner* — Tuyen Tra
(74) *Attorney, Agent, or Firm* — ALG Intellectual Property, LLC

(57) ABSTRACT

An electro-optic device includes a first substrate, a second substrate, an electro-optic layer which is interposed between the second substrate and the first substrate, and a first translucent film, a second translucent film, and a third translucent film which are disposed between the second substrate and the electro-optic layer and are sequentially formed from the second substrate, in which the refractive index of the second translucent film is larger than the refractive index of the second substrate, is smaller than the refractive index of the first translucent film, and is smaller than the refractive index of the third translucent film. A transmittance of incident light of the electro-optic device is intensified using refractive index matching, interference dimming, and anti-scattering.

8 Claims, 7 Drawing Sheets

FIG. 4

| MEMBER | (EXAMPLE) | PHYSICAL QUANTITY | m | BLUE ($\lambda = 460$ nm) | GREEN ($\lambda = 550$ nm) | RED ($\lambda = 630$ nm) |
|---|---|---|---|---|---|---|
| FIRST AND THIRD TRANSLUCENT FILMS | (ITO) | REFRACTIVE INDICES $n_1$ AND $n_3$ | | 1.947 | 1.850 | 1.787 |
| SECOND, FOURTH, AND FIFTH TRANSLUCENT FILMS | (BPSG) | REFRACTIVE INDICES $n_2$, $n_4$, AND $n_5$ | | 1.498 | 1.494 | 1.492 |
| SECOND SUBSTRATE | (QUARTZ GLASS) | REFRACTIVE INDEX $n_S$ | | 1.465 | 1.460 | 1.475 |
| FIRST AND THIRD TRANSLUCENT FILMS | (ITO) | ABSORPTION COEFFICIENTS $\alpha_1$ AND $\alpha_3$ (nm$^{-1}$) | | $7.629 \times 10^{-4}$ | $3.527 \times 10^{-4}$ | $5.140 \times 10^{-5}$ |
| FIRST AND THIRD TRANSLUCENT FILMS | (ITO) | THIN FILMS $d_1$ AND $d_3$ (nm) | | 29 | 37 | 43 |
| FIRST AND THIRD TRANSLUCENT FILMS | (ITO) | TRANSMISSION RATE (%) | | 97.8% | 98.7% | 99.8% |
| SECOND TRANSLUCENT FILM | (BPSG) | THIN FILM $d_2$ (nm) | m = 0 | 39 | 47 | 54 |
| SECOND TRANSLUCENT FILM | (BPSG) | THIN FILM $d_2$ (nm) | m = 1 | 192 | 231 | 265 |
| SECOND TRANSLUCENT FILM | (BPSG) | THIN FILM $d_2$ (nm) | m = 2 | 346 | 415 | 476 |

ELECTRO-OPTIC DEVICE AND ELECTRONIC APPARATUS

BACKGROUND

1. Technical Field

The present invention relates to an electro-optic device and an electronic apparatus.

2. Related Art

In an electronic apparatus with a display function, a transmission-type electro-optic device or a reflection-type electro-optic device is used. As light is radiated to the electro-optic device, transmitted light or reflected light which is modulated by the electro-optic device becomes either a display image or a projected image projected on a screen. As the electro-optic device used for such an electronic apparatus, a liquid crystal apparatus is known. The liquid crystal apparatus forms an image by using dielectric anisotropy of a liquid crystal or optical rotation of the light in a liquid crystal layer. In the reflection-type liquid crystal apparatus, as disclosed in JP-A-2007-178774, the liquid crystal layer is interposed between a semiconductor substrate in which a pixel electrode having light reflectivity is formed and a transparent substrate in which a transparent electrode layer (transparent multilayer film) is formed. A first transparent film (ITO film) having a first refractive index, a second transparent film (SiO$_2$ film) having a smaller second refractive index than the first refractive index, a third transparent film (ITO film) having a third refractive index larger than the second refractive index are sequentially stacked on the transparent multilayer film opposed to the pixel electrode across the liquid crystal layer. As a result, image unevenness is attenuated using the reflection-type liquid crystal apparatus and a light transmission rate of the transparent electrode layer can be 98% or more.

However, in the liquid crystal apparatus of the related art, which is disclosed in JP-A-2007-178774, there has been a problem in that contrast ratio is low during bright display and dark display. The bright display in the reflection-type liquid crystal apparatus is in a state where reflectance is large with respect to the incident light in the liquid crystal apparatus. In addition, the dark display in the reflection-type liquid crystal apparatus is in a state where reflectance with respect to the incident light in the liquid crystal apparatus is small, so called, and is black display. The reflectance during the bright display with respect to the reflectance during the dark display is the contrast ratio, however, in the liquid crystal apparatus of the related art, there has been a problem in that the contrast ratio is low due to the low reflectance during the bright display or the high reflectance during the dark display or the result of these two.

SUMMARY

The invention can be realized in the following forms or application examples.

According to this application example, there is provided an electro-optic device including a first substrate, a translucent second substrate, an electro-optic layer which is interposed between the second substrate and the first substrate, and a first translucent film, a second translucent film, and a third translucent film which are disposed between the second substrate and the electro-optic layer and are sequentially formed from the second substrate, in which the refractive index of the second translucent film is larger than the refractive index of the first translucent film, is smaller than the refractive index of the second substrate, and is smaller than the third translucent film.

In this case, since the refractive index of the second translucent film is larger than the refractive index of the second substrate, the light (referred to as third reflected light) in which the incident light of the electro-optic device reflects at the interface (referred to as one-two interface) between the first translucent film and the second translucent film may be attenuated. As a result, since the third reflected light from the one-two interface is attenuated during the dark display, the reflectance during the dark display may be attenuated. Furthermore, since the third reflected light at the one-two interface is attenuated during the bright display, the transmittance of the incident light at the one-two surface is improved and the reflectance during the bright display may be intensified. That is, the reflectance during the bright display is improved, and at the same time, the reflectance during the dark display may be reduced. Thus, the electro-optic device forming an image having high contrast ratio may be realized.

It is preferable that the electro-optic device according to the application example, further include a fourth translucent film between the second substrate and the first translucent film, in which the refractive index of the fourth translucent film is larger than the refractive index of the second substrate and is smaller than the refractive index of the first translucent film.

The refractive index of the first translucent film is set to n$_1$, the film thickness of the first translucent film is set to d$_1$, the refractive index of the second translucent film is set to n$_2$, and the film thickness of the second translucent film is set to d$_2$, and this satisfies the relation of Equation 1.

$$n_1 d_1 + n_2 d_2 = \left(\frac{1}{4} + \frac{m}{2}\right)\lambda \qquad (1)$$

m is an integer larger than or equal to zero (m=0, 1, 2, 3, . . . ) and λ is a wavelength of light that represents the incident light. Besides, in this configuration, the light (referred to as second reflected light) in which the incident light to the electro-optic device is reflected at the interface between the fourth translucent film and the first translucent film (referred to as four-one interface) and the light (referred to as fourth reflected light) in which the incident light is reflected at the interface between the second translucent film and the third translucent film (referred as two-three interface) may be attenuated due to interference. That is, the transmittance of the incident light in the first translucent film and the second translucent film may be intensified. As a result, since the second reflected light from the four-one interface or the fourth reflected light from the two-three interface is attenuated during the dark display, the reflectance during the dark display may be attenuated. Furthermore, since the second reflected light or the fourth reflected light is attenuated during the bright display, the transmittance of the incident light in the first translucent film and the second translucent film are improved and the reflectance during the bright display may be intensified. That is, the reflectance during the bright display is intensified, and at the same time, the reflectance during the dark display may be attenuated. Thus, the electro-optic device forming an image having high contrast ratio may be realized.

In the electro-optic device according to the application example, it is preferable that the refractive index of the first translucent film and the refractive index of the third translucent film be substantially the same, and the refractive index of the second translucent film and the refractive index of the fourth translucent film be substantially the same.

The first translucent film and the third translucent film may be formed in the same film in order to equalize the refractive index of the first translucent film and the refractive index of the third translucent film. Therefore, in this configuration, the first translucent film and the third translucent film may be formed by the single film-forming method, and the manufacturing of the first translucent film and the third translucent film may be easily performed. In addition, the second translucent film and the fourth translucent film may be formed of the same film in order to equalize the refractive index of the second translucent film and the refractive index of the fourth translucent film. Therefore, in this configuration, the second translucent film and the fourth translucent film may be formed by the single film-forming method, and the manufacturing of the second translucent film and the fourth translucent film may be easily performed. Furthermore, the light (referred to as seventh reflected light) in which light (for convenience, referred to as first reflected light) travelling to the second substrate from the first substrate is reflected at the two-three interface and the light (referred to as ninth reflected light) reflected at the four-one interface may be attenuated due to interference. That is, the transmittance of the first reflected light in the first translucent film and the second translucent film may be intensified. In addition, it is necessary that a phase of the second reflected light and a phase of the fourth reflected light are deviated from each other 180° in order to attenuate the interferences to the second reflected light and the fourth reflected light. Furthermore, it is desirable that an amplitude of the fourth reflected light and an amplitude of the second reflected light be in the same range. In the same manner, it is necessary that a phase of the seventh reflected light and a phase of the ninth reflected light are deviated from each other at 180° in order to attenuate the interferences to the seventh reflected light and the ninth reflected light. Furthermore, it is desirable that an amplitude of the seventh reflected light and an amplitude of the ninth reflected light be in the same range. In this case, since an amplitude of the fourth reflected light is close to an amplitude of the second reflected light, and at the same time, an amplitude of the ninth reflected light is close to an amplitude of the seventh reflected light, the second reflected light and the fourth reflected light effectively cancel out each other and the seventh reflected light and the ninth reflected light effectively cancel out each other. As a result, the reflectance during the dark display is attenuated, and the reflectance during the bright display may be intensified. That is, the reflectance during the bright display is improved, and at the same time, the reflectance during the dark display may be reduced. Thus, the electro-optic device forming an image having high contrast ratio may be realized.

It is preferable that the electro-optic device according to the application example, further include a fifth translucent film on the third translucent film, in which the refractive index of the fifth translucent film is larger than the refractive index of the second substrate and is smaller than the refractive index of the third translucent film.

The refractive index of the third translucent film is set to $n_3$, the film thickness of the third translucent film is set to $d_3$, the refractive index of the second translucent film is set to $n_2$, and the film thickness of the second translucent film is set to $d_2$, and this satisfies the relation of Equation 2.

$$n_3 d_3 + n_2 d_2 = \left(\frac{1}{4} + \frac{m}{2}\right)\lambda \quad (2)$$

Here, m is an integer larger than or equal to zero (m=0, 1, 2, 3, . . . ) and λ is a wavelength of light that represents the incident light. Besides, in this configuration, the light (referred to as third reflected light) in which the incident light to the electro-optic device is reflected at the interface between the first translucent film and the second translucent film (referred to as one-two interface) and the light (referred to as fifth reflected light) in which the incident light is reflected at the interface between the third translucent film and the fifth translucent film (referred as three-five interface) may be attenuated due to interference. That is, the transmittance of the incident light in the second translucent film and the third translucent film may be intensified. As a result, since the third reflected light from the one-two interface or the fifth reflected light from the three-five interface is attenuated during the dark display, the reflectance during the dark display may be attenuated. Furthermore, since the third reflected light and the fifth reflected light is attenuated during the bright display, the transmittance of the incident light in the second translucent film and the third translucent film is improved, and the reflectance during the bright display may be intensified. That is, the reflectance during the bright display is improved, and at the same time, the reflectance during the dark display may be reduced. Thus, the electro-optic device forming an image having high contrast ratio may be realized.

In the electro-optic device according to the application example, it is preferable that the refractive index of the first translucent film and the refractive index of the third translucent film be substantially the same, and the refractive index of the second translucent film and the refractive index of the fifth translucent film be substantially the same.

The first translucent film and the third translucent film may be formed in the same film in order to equalize the refractive index of the first translucent film and the refractive index of the third translucent film. Therefore, in this configuration, the first translucent film and the third translucent film may be formed by the single film-forming method, and the manufacturing of the first translucent film and the third translucent film may be easily performed. In addition, the second translucent film and the fifth translucent film may be formed in the same film in order to equalize the refractive index of the second translucent film and the refractive index of the fifth translucent film. Therefore, in this configuration, the second translucent film and the fifth translucent film may be formed by the single film-forming method, and the manufacturing of the second translucent film and the fifth translucent film may be easily performed. Furthermore, the light (referred to as sixth reflected light) in which the first reflected light is reflected at the three-five interface and the light (referred to as eighth reflected light) reflected at the one-two interface may be attenuated due to interference. That is, the transmittance of the first reflected light in the first translucent film and the second translucent film may be intensified. In addition, it is necessary that a phase of the third reflected light and a phase of the fifth reflected light are deviated from each other at 180° in order to attenuate the interferences to the third reflected light and the fifth reflected light. Furthermore, it is desirable that an amplitude of the third reflected light and an amplitude of the fifth reflected light be in the same range. In the same manner, it is necessary that a phase of the sixth reflected light and a phase of the eighth reflected light are deviated from each other at 180° in order to attenuate the interferences to the sixth reflected light and the eighth reflected light. Furthermore, it is desirable that an amplitude of the sixth reflected light and an amplitude of the eighth reflected light be in the same range. In this case, since an amplitude of the fifth reflected light is close to an amplitude of the third reflected light, and at the same time, an amplitude of the eighth reflected light is close to an amplitude of the sixth reflected light, the third reflected light and the fifth reflected light effectively cancel out each other and the sixth reflected light and the eighth reflected light effectively cancel out each other. As a result, the reflectance during the dark display is attenuated, and the reflectance during the bright display may be intensified. That is, the reflectance during the bright display is improved, and at the same time, the reflectance during the dark display may be reduced. Thus, the electro-optic device forming an image having high contrast ratio may be realized.

In the electro-optic device according to the application example, it is preferable that the second translucent film be a silicon oxide film containing boron and phosphorus.

In this case, since the two-three interface may be flattened, light scattering at the two-three interface is attenuated, as a result, the second reflected light and the fourth reflected light effectively cancel out each other, and at the same time, the seventh reflected light and the ninth reflected light effectively cancel out each other. In addition, since the light scattering at the two-three interface is attenuated, the transmittance of the incident light at the two-three interface intensifies, and at the same time, the transmittance of the first reflected light at the two-three interface intensifies. As a result, the reflectance during the dark display is attenuated, and the reflectance during the bright display may be intensified. That is, the reflectance during the bright display is improved, and at the same time, the reflectance during the dark display may be reduced. Thus, the electro-optic device forming an image having high contrast ratio may be realized.

In the electro-optic device according to the application example, it is preferable that the third translucent film be electrically conductive.

In this case, the third translucent film may be used as a common electrode.

According to this application example, there is provided an electronic apparatus including the electro-optic device according to any one of the application examples.

In this case, the reflectance during the bright display is improved, and at the same time, the reflectance during the dark display may be reduced. Thus, the electro-optic device forming an image having high contrast ratio may be realized.

BRIEF DESCRIPTION OF THE DRAWINGS

The invention will be described with reference to the accompanying drawings, wherein like numbers reference like elements.

FIG. 1A is a plan view and FIG. 1B is a cross-sectional view cut in IB-IB of FIG. 1A.

FIG. 4 is a view illustrating an application example with respect to a fifth translucent film from a first translucent film.

DESCRIPTION OF EXEMPLARY EMBODIMENTS

Hereinafter, description will be given with respect to an embodiment of the invention with reference to the drawings.

Moreover, in the respective figures below, measures of respective layers or respective members are different from actual measures in order to make the sizes of respective layers or respective members recognizable.

First Embodiment

Overview of Electro-Optic Apparatus

Figure 1A:
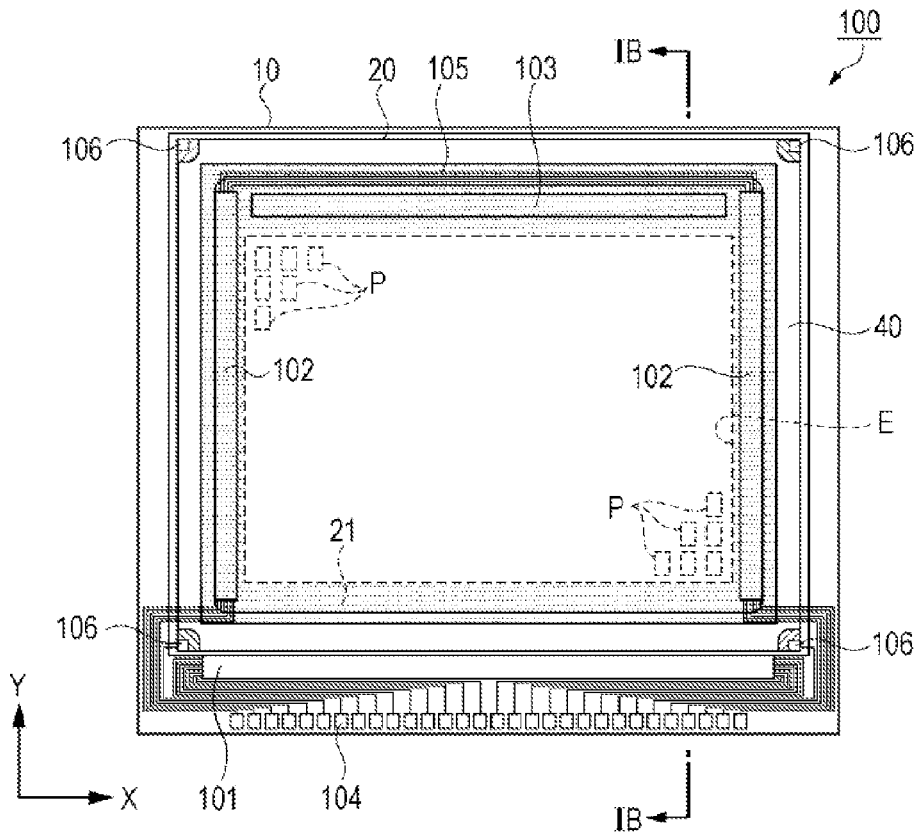
FIGS. 1A and 1B are views illustrating a configuration of a liquid crystal apparatus, where
Figure 1B:
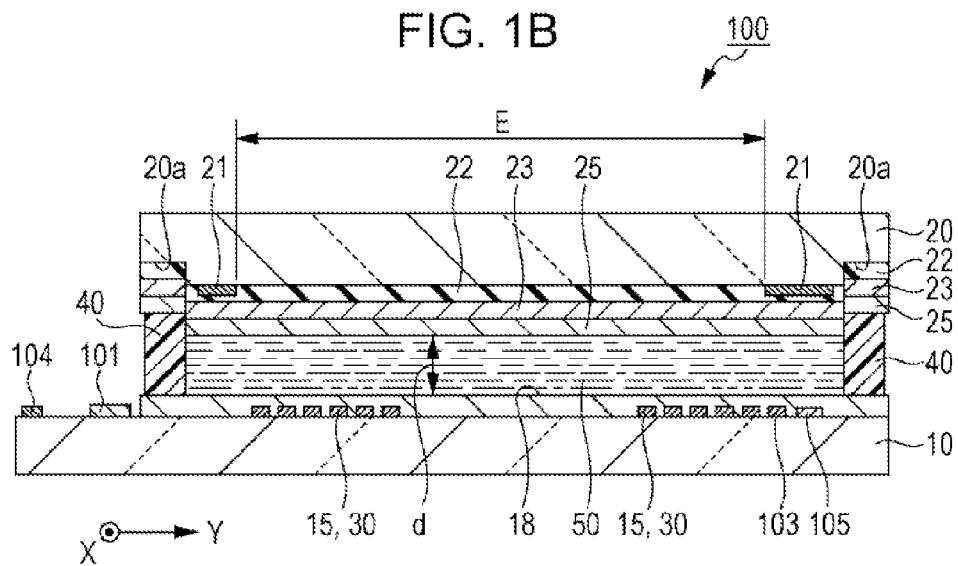

FIG. 1 is a view illustrating a configuration of a liquid crystal apparatus, where FIG. 1A is a plan view and FIG. 1B is a cross-sectional view cut in IB-IB of FIG. 1A. First, description will be given of the overview of the electro-optic device with reference to FIG. 1.

In the present embodiment, the electro-optic device is a reflection-type liquid crystal apparatus 100, and the liquid crystal apparatus 100 has a thin film transistor (TFT) 30 as a pixel switching element. Moreover, in the drawing referring to the following descriptions, when a layer formed on an element substrate is described, an upper layer or a surface means an opposite side (where opposed substrate is positioned) from a side where a substrate body of the element substrate is positioned, and a lower layer means the side where the substrate body of the element substrate is positioned. In addition, when a layer formed on the opposed substrate is described, an upper layer or a surface means an opposite side (where element substrate is positioned) from a side where a substrate body of the opposed substrate is positioned, and a lower layer means a side where the substrate body of the opposed substrate is positioned.

As illustrated in FIGS. 1A and 1B, the electro-optic device (liquid crystal apparatus 100) has a first substrate (element substrate 10) and a translucent second substrate (opposed substrate 20), and an electro-optic layer (liquid crystal layer 50) interposed between the first substrate and the second substrate.

As for the element substrate 10, for example, transparent quartz glass or alkali-free glass or an opaque silicon substrate can be used, and the element substrate is slightly larger than that of the opposed substrate 20. In addition, the element substrate 10 is bonded to the opposed substrate 20 via the seal materials 40 continuously disposed along an outer periphery of the opposed substrate 20. A liquid crystal having a negative dielectric anisotropy in a region surrounded by the seal materials 40 is sealed to configure the liquid crystal layer 50. In addition, a one drop fill method (ODF method) is used for sealing (filling) a liquid crystal between the element substrate 10 and the opposed substrate 20. The one drop fill method is that the seal materials 40 are disposed along the outer periphery of the substrate (element substrate 10 in present embodiment), and a predetermined amount of liquid crystal is dropped inwards therefrom using the disposed seal materials 40 as banks, and then one side of the substrate and the other side of the substrate are bonded to each other under the reduced pressure. As the seal material 40, an adhesive such as a thermosetting or an ultraviolet curable epoxy is employed. In the seal material 40, a spacer (not illustrated) for constantly maintaining an interval between the element substrate 10 and the opposed substrate 20 is incorporated.

A parting portion 21 is provided inwards from the seal material 40 so as to surround a pixel region E. A plurality of pixels P are disposed in the pixel region E in a matrix manner. A plurality of dummy pixels disposed so as to surround the plurality of effective pixels P that contribute to the display may be included in the pixel region E. Moreover, although not illustrated in FIG. 1, a light blocking portion (black matrix, BM) partitioning the plurality of pixels P in a plane is provided in the pixel region E.

A signal line driving circuit 101 is provided between the seal material 40 along a first side portion of the element substrate 10 and the first side portion. A test circuit 103 is provided inwards from the seal material 40 along another first side portion opposed to the first side portion. In addition, a scanning line driving circuit 102 is provided inwards from the seal material 40 along another second side portion that is perpendicular and opposed to the first side portion. A plurality of wires 105 connecting two scanning line driving circuits 102 are provided inwards from the seal material 40 along another first side portion opposed to the first side portion. The wires 105 connected to the signal line driving circuit 101 and the scanning line driving circuit 102 are connected to a plurality of external connection terminals 104 arrayed along the first side portion. Hereinafter, description will be given on the assumption that a direction along the first side portion is set to an X direction and a direction along another second side portion that is perpendicular and opposed to the first side portion is set to a Y direction.

As illustrated in FIG. 1B, pixel electrodes 15 having light reflectivity provided for each pixel P, TFTs 30 as switching elements, various wires 105, an insulating layer (not illustrated) covering the plurality of pixel electrodes 15, and an alignment layer 18 are formed on the surface of the liquid crystal layer 50 of the element substrate 10. The pixel electrode 15 is formed using a light reflective compound, for example, aluminum (Al), or silver (Ag), or an alloy or an oxide of these metals. In addition, a light blocking configuration that prevents an improper switching operation by light incident on a semiconductor layer in the TFT 30 and the flow of the light leak current is employed.

As for the opposed substrate 20, for example, transparent quartz or alkali-free glass is used. In the present embodiment, quartz glass is used. The parting portion 21, and a fourth translucent film 22 covering the parting portion 21, a translucent multilayer film 23 provided so as to cover the fourth translucent film 22 over at least the pixel region E, a fifth translucent film 24 (refer to FIG. 3) covering the translucent multilayer film 23, and an alignment layer 25 are formed on the surface of the liquid crystal layer 50 of the opposed substrate 20. The translucent multilayer film 23 has a first translucent film 23a (refer to FIG. 3), a second translucent film 23b (refer to FIG. 3), and a third translucent film 23c (refer to FIG. 3) which are sequentially formed from the second substrate (opposed substrate 20).

The parting portion 21, for example, is made of a light-blocking metal, or a light-blocking metal oxide, or the like, and as illustrated in FIG. 1A, is provided in a plane at a position overlapping with the scanning line driving circuit 102 or the test circuit 103. As a result, the light incident from the opposed substrate 20 is shielded, and a malfunction due to the light of peripheral circuits including the driving circuits is prevented. In addition, unnecessary stray light is shielded so as not to be incident on the pixel region E, and a high contrast in the display of the pixel region E is secured.

The translucent multilayer film 23, the fourth translucent film 22, and the fifth translucent film 24 are configured so as to have high transmission rates by a visible wavelength. The third translucent film 23c configuring the translucent multilayer film 23 is electrically conductive and the third translucent film 23c functions as a common electrode. The third translucent film 23c is electrically connected to a wire of the element substrate 10 by upper and lower conductive portions 106 provided at the four corners of the opposed substrate 20.

An alignment layer 18 of the element substrate 10 and the alignment layer 25 of the opposed substrate 20 are provided based on an optical design of the liquid crystal apparatus 100. In the present embodiment, the alignment layer 18 or the alignment layer 25 is formed by a physical gas phase sedimentation method (oblique vapor deposition method or oblique sputtering method) using an inorganic material such as silicon oxide (SiOx). Liquid crystal molecules form a pre-tilt angle in a predetermined direction and are opposed with respect to the surface of the alignment layer by the alignment layer 18 or the alignment layer 25.

The opposed substrate 20 has concave portions 20a in which portions overlapping with the seal materials 40 in a plane are formed at a constant depth. The concave portion 20a is formed outwards from the parting portion 21 of the opposed substrate 20 over an outer periphery of the substrate. The fourth translucent film 22, the translucent multilayer film 23, the fifth translucent film 24, and the alignment layer 25 are also respectively formed on the concave portion 20a. If considering the thickness of the liquid crystal layer 50 when the element substrate 10 and the opposed substrate 20 are disposed opposite to each other across the liquid crystal layer 50 as d, a spacer (not illustrated) having a diameter larger than the thickness d of the liquid crystal layer 50 is included in the seal material 40 in consideration of the depth of the concave portion 20a. According to such a cross-sectional configuration of the opposed substrate 20, since it is possible to adhere the element substrate 10 and the opposed substrate 20 to be disposed opposite to each other using the seal material 40 in which the spacer having a diameter larger than the thickness of the liquid crystal layer 50, it is possible to suppress the thickness variation of the liquid crystal layer 50.

Circuit Configuration

Figure 2:
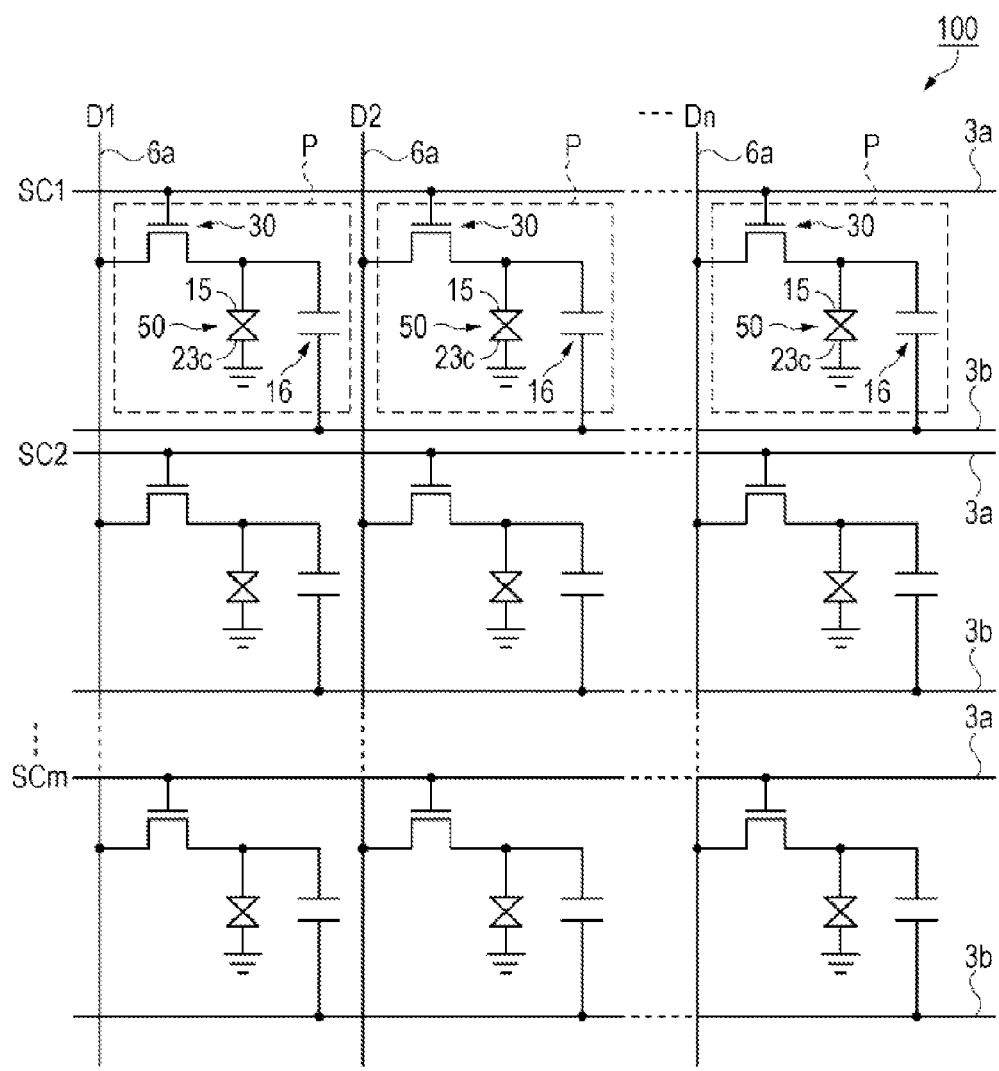
FIG. 2 is an equivalent circuit diagram illustrating an electrical configuration of the liquid crystal apparatus.

FIG. 2 is an equivalent circuit diagram illustrating an electrical configuration of the liquid crystal apparatus. Next, a circuit configuration will be described with reference to FIG. 2.

As illustrated in FIG. 2, the liquid crystal apparatus 100 has a plurality of scanning lines 3a and a plurality of signal lines 6a which are insulated and orthogonal to each other at least at the pixel region E, and a plurality of capacity lines 3b parallel to the scanning lines 3a. Moreover, the disposition of the capacity line 3b is not limited thereto, and the capacity line 3b may be disposed so as to be parallel with respect to the signal line 6a.

The pixel electrode 15, the TFT 30, and the retention capacity 16 are provided in the region partitioned by the scanning line 3a and signal line 6a, and these elements configure the pixel circuit of the pixel P.

The scanning line 3a is electrically connected to a gate electrode 30g (refer to FIG. 3) of the TFT 30, and the signal line 6a is electrically connected to a source region of the TFT 30. The pixel electrode 15 is electrically connected to a drain region of the TFT 30.

The signal line 6a is connected to the signal line driving circuit 101, and supplies image signals D1, D2, ..., Dn supplied from the signal line driving circuit 101 to the pixel P. The scanning line 3a is connected to the scanning line driving circuit 102, and supplies scanning signals SC1, SC2, ..., SCm supplied from the scanning line driving circuit 102 to each pixel P. The image signals D1 to Dn supplied to the signal line 6a from the signal line driving circuit 101 may be sequentially supplied to each signal line 6a, or may be supplied to each group by dividing the plurality of signal lines 6a into several groups. The scanning line driving circuit 102 supplies the scanning signals SC1 to SCm with respect to the scanning line 3a, and sequentially selects one or more scanning lines 3a from the plurality of scanning lines 3a.

In the pixel P positioned in i-th row and j-th column (i is an integer of 1 to m, j is an integer of 1 to n), the TFT 30 is in an ON state during the period (selection period) when the scanning signal SCi is a selection signal, and the image signal Dj is supplied to the pixel electrode 15 from the signal line 6a via the TFT 30. Thus, an electrical potential depending on the image signal Dj in the selection period is supplied to the pixel electrode 15, and an optical state of the liquid crystal layer 50 is determined depending on the difference in the electrical potential between the pixel electrode 15 and the common electrode. The TFT 30 is in an OFF state and the electrical potential of the pixel electrode 15 is held during the period (non-selection period) when the scanning signal SCi is a non-selection signal. The retention capacity 16 is connected to a liquid crystal capacity formed between the pixel electrode 15 and the common electrode (third translucent film 23c) in parallel in order to attenuate an electrical potential variation of the pixel electrode 15 during the non-selection period. The retention capacity 16 is provided between the drain region and the capacity line 3b of the TFT 30.

The signal line 6a is connected to the test circuit 103 illustrated in FIG. 1A and is configured to be able to confirm operation defects or the like of the liquid crystal apparatus 100 by detecting the test signals during the manufacturing process of the liquid crystal apparatus 100. However, the signal line is not illustrated in the equivalent circuit of FIG. 2. In addition, the test circuit 103 may include a sampling circuit supplying the test signals to the signal line 6a by sampling the test signals and a pre-charge circuit supplying pre-charge signals of a predetermined voltage level to the signal line 6a before the test signals.

Such a liquid crystal apparatus 100 is a reflection type, and employs a normally-black mode in which the pixel P turns into a bright display when liquid crystal apparatus is not driven or a normally-white mode in which the pixel P turns into a dark display when the liquid crystal apparatus is not driven. A polarizing element is disposed on the incident side (exit side) of the light depending on the optical design.

Cross-Sectional Structure

Figure 3:
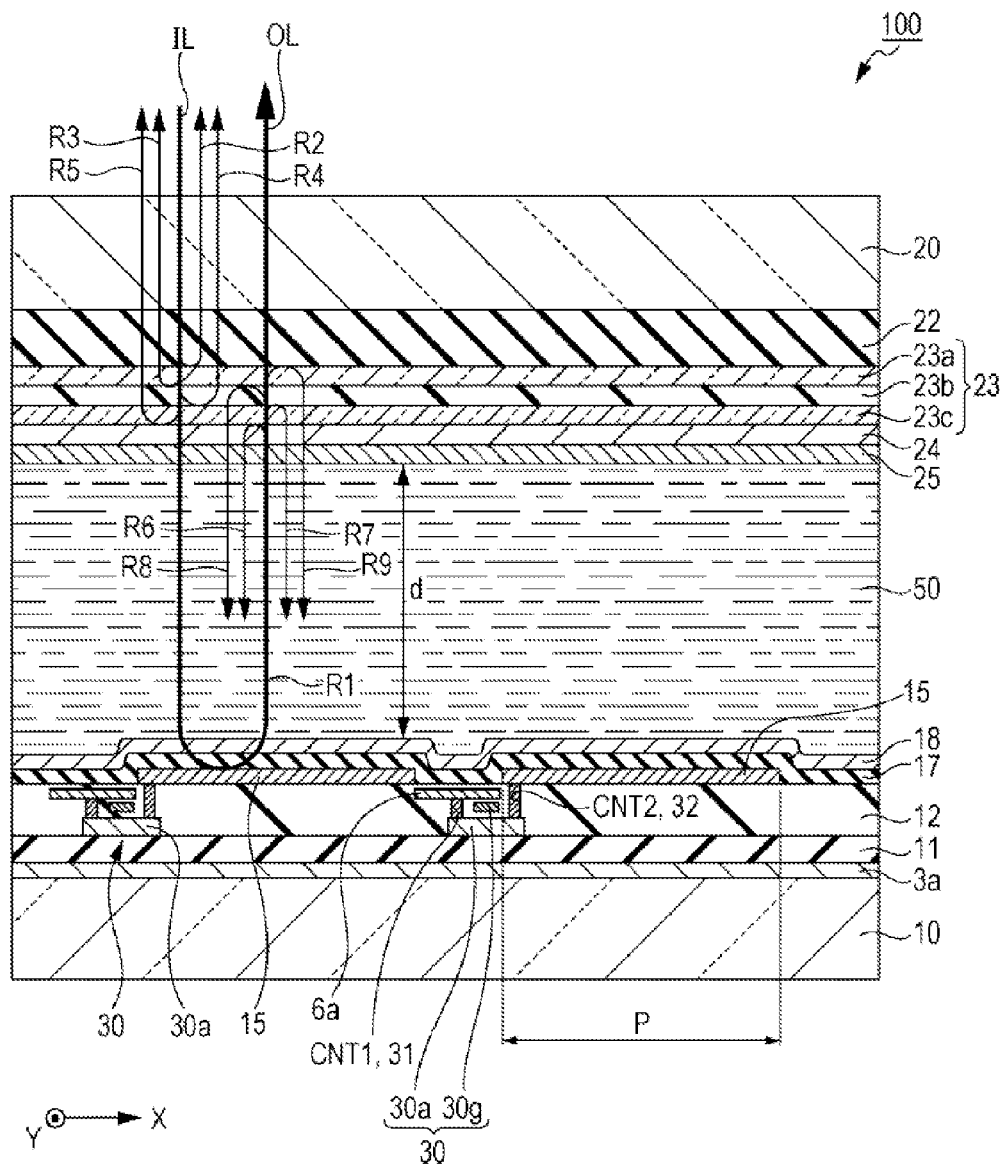
FIG. 3 is a cross-sectional view illustrating a configuration in a pixel portion of the liquid crystal apparatus.

FIG. 3 is a cross-sectional view illustrating a structure in the pixel portion of the liquid crystal apparatus. Next, a cross-sectional structure in the pixel portion of the liquid crystal apparatus will be described in detail with reference to FIG. 3.

As illustrated in FIG. 3, the scanning line 3a, a first interlayer insulating film 11 covering the scanning line 3a, the TFT 30, and a second interlayer insulating film 12 covering the TFT 30, the pixel electrode 15, a third interlayer insulating film 17 covering the pixel electrode 15, and the alignment layer 18 are sequentially formed on the element substrate 10.

The scanning line 3a also serves as a light blocking film that blocks the light on the semiconductor layer 30a of the TFT 30. In addition, as for the scanning line, for example, one metal simple substance, an ally, metal silicide, polysilicide, nitride, or any substance on which the above materials are stacked, which contain at least one of the metals such as Al, Ti, Cr, W, Ta, and Mo, and the like, can be used.

The semiconductor layer 30a of the TFT 30 includes a channel formation region, the source region, and the drain region. In the present embodiment, the semiconductor layer 30a is a polycrystalline silicon film and configured between the channel formation region and the drain region to be a light doped drain (LDD) structure containing donor-type elements such as phosphorus at low concentrations. The semiconductor layer 30a is formed on the first interlayer insulating film 11. The semiconductor layer 30a is covered by a gate insulating film (not illustrated), and a gate electrode 30g is formed on the gate insulating film. The semiconductor layer 30a that faces the gate electrode 30g via the gate insulating film is the channel region. The gate electrode 30g and the scanning line 3a are electrically connected to each other via a contact hole (not illustrated) passing through the first interlayer insulating film 11.

One region of the source region and the drain region of the semiconductor layer 30a is electrically connected to the signal line 6a via a contact hole CNT1, and the other region of the source region and the drain region of the semiconductor layer 30a are electrically connected to the pixel electrode 15 via a contact hole CNT2. Since the source region and the drain region of the transistor can be interchanged depending on the electrical potential, herein, for convenience, a region connected to the signal line 6a is called a source region, and a region connected to the pixel electrode 15 is called a drain region. That is, the signal line 6a functions as the source electrode 31 of the TFT 30, and the pixel electrode 15 functions as the drain electrode 32 of the TFT 30. The contact hole CNT1 and the contact hole CNT 2 are formed into the second interlayer insulating film 12.

The pixel electrode 15, as described above, for example, is formed using aluminum (Al), silver (Ag), or compounds such as oxides and alloys of these metals, and has light reflectivity. The film thickness of the pixel electrode 15 is in a range of 50 nm to 100 nm.

The third interlayer insulating film 17 covering the pixel electrode 15, for example, is made of silicon oxide, and can be formed by the sputtering method or a plasma chemical vapor deposition method. The film thickness of the third interlayer insulating film 17 is approximately 100 nm.

The alignment layer 18 is formed by the physical gas phase sedimentation method (oblique vapor deposition method or oblique sputtering method) using the inorganic material such as silicon oxide (SiOx). The film thickness of the alignment layer 18 is approximately 75 nm.

The fourth translucent film 22 covering the black matrix (BM), the first translucent film 23a having a refractive index larger than that of the fourth translucent film 22, the second translucent film 23b having a refractive index smaller than that of the first translucent film 23a, the third translucent film 23c having a refractive index larger than that of the second translucent film 23b, the fifth translucent film 24 having a refractive index smaller than that of the electrically-conductive third translucent film 23c, and the alignment layer 25 are sequentially formed on the liquid crystal layer 50 of the opposed substrate 20 which is disposed opposite to the element substrate 10. The translucent multilayer film 23 is configured of the first translucent film 23a, the second translucent film 23b, and the third translucent film 23c which are stacked. In short, the fourth translucent film 22 is formed between the second substrate (opposed substrate 20) and the first translucent film 23a, and the fifth translucent film 24 is formed on the third translucent film 23c. The relation between the refractive index and the thickness of each translucent film will be described later.

The black matrix (BM) is formed in a reticular pattern extending in the X and Y directions in a plan view in the opposed substrate 20 so as to divide the pixel P into pieces, and is formed simultaneously with the parting portion 21. The black matrix is formed using a metal such as nickel (Ni) or chromium (Cr) or a compound thereof which has the light blocking property. In the present embodiment, Cr is formed into a film by the sputtering method and is patterned in a reticular pattern. The film thickness thereof is approximately 75 nm. In addition, Cr in which an alignment mark which is used when bonding the element substrate 10 and the opposed substrate 20 is formed into a film is formed on the opposed substrate 20 by patterning.

Unevenness is generated on the surface of the opposed substrate 20 due to the black matrix or the above-described alignment mark. In forming the translucent multilayer film 23, the fourth translucent film 22 covering the surface of the opposed substrate 20 is formed so that a portion of the translucent multilayer film 23 is not damaged or deformed by the unevenness, and further, so that smoothness of the translucent multilayer film 23 is obtained.

During the bright display of such a reflection-type liquid crystal apparatus 100, the light (incident light IL) incident from the opposed substrate 20 passes through the liquid crystal layer 50, is reflected by the pixel electrode 15, and then turns into the first reflected light R1. The first reflected light R1 tracks back to the incident path, passes through the liquid crystal layer 50 again, is emitted from the opposed substrate 20, and then turns into emitted light OL. A portion of the light is reflected at the interface, in which the refractive index is different, of the film. A portion of the incident light IL to the electro-optic device from the opposed substrate 20, first, can be reflected at the interface (referred to as four-one interface) of the fourth translucent film 22 and the first translucent film 23a (the reflected light is referred to as second reflected light R2). Next, a portion of the incident light IL can be reflected at the interface (referred to as one-two interface) of the first translucent film 23a and the second translucent film 23b (the reflected light is referred to as third reflected light R3). Next, a portion of the incident light IL can be reflected at the interface (referred to as two-three interface) of the second translucent film 23b and the third translucent film 23c (the reflected light is referred to as fourth reflected light R4). Next, a portion of the incident light IL can be reflected at the interface (referred to as three-five interface) of the third translucent film 23c and the fifth translucent film 24 (the reflected light is referred to as fifth reflected light R5). Moreover, in the present embodiment, since quartz glass is used in a base material of the opposed substrate 20 and, as will be described later, a silicon oxide film having a refractive index close to the quartz glass is used in the fourth translucent film 22, the reflection of light at the interface of the opposed substrate 20 and the fourth translucent film 22 rarely occurs. In the same manner, as will be described later, since the fifth translucent film 24 is also formed using the silicon oxide film, the reflection of light at the interface of the fifth translucent film 24 and the alignment layer 25 also rarely occurs.

A portion of the first reflected light R1 reflected by the pixel electrode 15, first, can be reflected at the three-five interface (the reflected light is referred to as sixth reflected light R6). Next, a portion of the first reflected light R1 can be reflected at the two-three interface (the reflected light is referred to as seventh reflected light R7). Next, a portion of the first reflected light R1 can be reflected at the one-two interface (the reflected light is referred to as eighth reflected light R8). Next, a portion of the first reflected light R1 can be reflected at the four-one interface (the reflected light is referred to as ninth reflected light R9). As previously described, the reflection rarely occurs at the interface of the fifth translucent film 24 and the alignment layer 25 or at the interface of the opposed substrate 20 and the fourth translucent film 22. Thus, the first reflected light R1 turns into the emitted light OL, and is emitted from the electro-optic device.

During the dark display of the liquid crystal apparatus 100, it is ideal for the incident light IL to be completely absorbed at the liquid crystal layer 50.

Since the emitted light OL that is emitted from the opposed substrate 20 is modulated and turns into the display light, not causing an attenuation in signal-to-noise ratio (S/N ratio) due to the unnecessary reflected light (second reflected light R2 to fifth reflected light R5) which turns into noises is required in order to increase the image quality to be displayed. For example, when intermediate adjustment is displayed, the second reflected light R2 to the fifth reflected light R5 turn into white noises. Furthermore, if the unnecessary reflected light (second reflected light R2 to fifth reflected light R5) is large, since the light, which reaches the pixel electrode 15, of the incident light IL is attenuated, the first reflected light R1 is attenuated and the modulated emitted light OL is also attenuated. As a result, the S/N ratio is further attenuated. Further, the unnecessary reflected light (second reflected light R2 to fifth reflected light R5) intensifies reflectance during the dark display. In addition, even during the bright display, since the unnecessary light (sixth reflected light R6 to ninth reflected light R9) acts so as to attenuate the first reflected light R1, the unnecessary light attenuates the emitted light OL and lowers the reflectance during the bright display. In order to avoid these adverse effects and increase the image quality to be displayed, in the present embodiment, the unnecessary reflected light (second reflected light R2 to fifth reflected light R5 and sixth reflected light R6 to ninth reflected light R9) is attenuated as is possible by adapting three methods of (1) refractive index matching, (2) interference dimming, and (3) anti-scattering. Hereinafter, the three methods will be described.

First, the refractive index matching will be described. The refractive index of the first translucent film 23a is set to $n_1$, the film thickness of the first translucent film 23a is set to $d_1$, the refractive index of the second translucent film 23b is set to n2, the film thickness of the second translucent film 23b is set to $d_2$, the refractive index of the third translucent film 23c is set to $n_3$, the film thickness of the third translucent film 23c is set to $d_3$, the refractive index of the fourth translucent film 22 is set to $n_4$, and the refractive index of the fifth translucent film 24 is set to $n_5$, and the refractive index of the second substrate (opposed substrate 20) is set to $n_S$. Then, the refractive index $n_2$ of the second translucent film 23b is set to be larger than the refractive index $n_S$ of the second substrate, is set to be smaller than the refractive index $n_1$ of the first translucent film 23a, and is set to be smaller than the refractive index $n_3$ of the third translucent film 23c. That is, $n_S<n_2<n_1$ and $n_S<n_2<n_3$. If the refractive index matching technology is used, the incident light IL can attenuate the third reflected light R3 to be reflected at the one-two interface or the fourth reflected light R4 to be reflected at the two-three interface since the refractive index $n_2$ of the second translucent film 23b is larger than the refractive index $n_S$ of the second substrate and becomes close to the refractive index $n_1$ of the first translucent film 23a and the refractive index $n_3$ of the third translucent film 23c compared with a case where the second translucent film 23b is formed a material having the same refractive index with the second substrate. In the same manner, the first reflected light R1 can attenuate the eighth reflected light R8 to be reflected at the one-two interface and the seventh reflected light R7 to be reflected at the two-three interface. This, in general, is because a reflectance R when the light is perpendicularly incident on a medium b having a plurality of refractive indices $n_b+ik_b$ from a medium a having a plurality of refractive indices $n_a+ik_a$ is expressed in Equation 3 and Equation 4.

$$R = \frac{(n_a - n_b)^2 + (k_a - k_b)^2}{(n_a + n_b)^2 + (k_a + k_b)^2} \quad (3)$$

$$T = 1 - R$$

If the refractive index $n_2$ of the second translucent film 23b is larger than the refractive index $n_S$ of the second substrate and the difference between the refractive index $n_1$ of the first translucent film 23a or the refractive index $n_3$ of the third translucent film 23c and the refractive index $n_2$ of the second translucent film 23b becomes a value smaller than the difference between the refractive index $n_S$ of the second substrate and the refractive index $n_1$ of the first translucent film 23a or the refractive index $n_3$ of the third translucent film 23c, it is possible to know that the third reflected light R3 and the fourth reflected light R4 and the seventh reflected light R7 and the eighth reflected light R8 is attenuated and the transmittance in the incident light IL or in the translucent multilayer film 23 of the first reflected light R1 is improved by Equation 3 and Equation 4.

Furthermore, the refractive index $n_4$ of the fourth translucent film 22 is set to be larger than the refractive index $n_s$ of the second substrate and is set to be smaller than refractive index $n_1$ of the first translucent film 23a with respect to the refractive index matching. That is, $n_S < n_4 < n_1$. In this manner, since the refractive index $n_4$ of the fourth translucent film 22 is larger than the refractive index $n_s$ of the second substrate and becomes a value close to the refractive index $n_1$ of the first translucent film 23a, the second reflected light R2 or the ninth reflected light R9 is attenuated and the transmittance of the incident light IL and the first reflected light R1 is improved by Equation 3 and Equation 4.

The refractive index $n_5$ of fifth translucent film 24 is set to be larger than the refractive index $n_s$ of the second substrate and is set to be smaller than refractive index $n_3$ of the third translucent film 23c with respect to the refractive index matching. That is, $n_S < n_5 < n_3$. In this manner, since the refractive index $n_5$ of the fifth translucent film 24 is larger than the refractive index $n_S$ of the second substrate and becomes a value close to the refractive index $n_3$ of third translucent film 23c, the fifth reflected light R5 or the sixth reflected light R6 is attenuated and the transmittance of the incident light IL or the first reflected light R1 is improved by Equation 3 and Equation 4.

Next, the interference dimming will be described. First, the refractive index $n_1$ of the first translucent film 23a, the film thickness $d_1$ of the first translucent film 23a, the refractive index $n_2$ of the second translucent film 23b, and the film thickness $d_2$ of the second translucent film 23b satisfy the relation of Equation 5.

$$n_1 d_1 + n_2 d_2 = \left(\frac{1}{4} + \frac{m}{2}\right)\lambda \quad (5)$$

Here, m is an integer larger than or equal to zero (m=0, 1, 2, 3, ...) and $\lambda$ is a wavelength of light that represents the incident light IL. The light representing the incident light IL, if the electro-optic device is only for red, turns red, for example, $\lambda$=630 nm. In addition, the light representing the incident light IL, if the electro-optic device is only for green, turns green, for example, $\lambda$=550 nm. In addition, the light representing the incident light IL, if the electro-optic device is only for blue, turns blue, for example, $\lambda$=460 nm. Furthermore, green serves as the light representing the incident light IL both in the electro-optic device only for red and the electro-optic device only for green, for example, $\lambda$ may be 550 nm. Furthermore, green in which human visual sensitivity is highest is used as the light representing the incident light IL in the electro-optic device for black and white or the color electro-optic device in which red, green, and blue are contained, for example, $\lambda$ may be 550 nm.

If the relation of Equation 5 is satisfied, the second reflected light R2 to be reflected at the four-one interface and the fourth reflected light R4 to be reflected at the two-three interface are attenuated due to interference with the incident lights IL. For the incident light IL, since both the four-one interface and the two-three interface form the interfaces from a medium with small refractive index to a medium with large refractive index, the reflection at both interfaces is a fixed end reflection and a phase is deviated at 180° both in the second reflected light R2 and the fourth reflected light R4. In short, a phase difference due to reflection does not occur in the second reflected light R2 and the fourth reflected light R4. On the other hand, since a sum of an optical film thickness (in which refractive index is applied to actual physical film thickness) of the first translucent film 23a and an optical film thickness of the second translucent film 23b is only the sum of an integral multiple ($m\lambda/2$) of one quarter wavelength ($\lambda/4$) and half wavelength, the optical path difference (difference in optical film thickness) in the second reflected light R2 and the fourth reflected light R4 is the sum of an integral multiple ($m\lambda$) of half wavelength ($\lambda/2$) and one wavelength. That is, if the relation of Equation 5 is satisfied, a phase difference between the fourth reflected light R4 and the second reflected light R2 is 180° and the both lights cancel each other out by mutual interference. Thus, since the reflection of the incident light IL at the four-one interface or the two-three interface is substantially prohibited by physical boundary conditions, the transmittance of the incident light IL in the first translucent film 23a and the second translucent film 23b intensifies. In the same manner, the ninth reflected light R9 to be reflected at the four-one interface and the seventh reflected light R7 to be reflected at the two-three interface are attenuated due to interference with the first reflected lights R1. For the first reflected light R1, since both the four-one interface and the two-three interface form the interfaces from a medium with large refractive index to a medium with small refractive index, the reflection at the both interfaces is a free end reflection and a phase is not deviated in either the ninth reflected light R9 or the seventh reflected light R7. In short, a phase difference due to reflection does not occur in the seventh reflected light R7 and ninth reflected light R9. On the other hand, as previously described, if the relation of Equation 5 is satisfied, a phase difference between the ninth reflected light R9 and the seventh reflected light R7 is 180° and the both lights cancel each other out by the mutual interference. Thus, the reflection of the first reflected light R1 at the four-one interface or the two-three interface is substantially prohibited by the physical boundary conditions, and the transmittance of the first reflected light R1 in the first translucent film 23a and the second translucent film 23b intensifies.

In the same manner, the refractive index $n_3$ of the third translucent film 23c, the film thickness $d_3$ of the third translucent film 23c, the refractive index $n_2$ of the second translucent film 23b, and the film thickness $d_2$ of the second translucent film 23b satisfy the relation of Equation 6.

$$n_3 d_3 + n_2 d_2 = \left(\frac{1}{4} + \frac{m}{2}\right)\lambda \quad (6)$$

Here, m is an integer larger than or equal to zero (m=0, 1, 2, 3, ...) and λ is a wavelength of light that represents the incident light IL.

If the relation of Equation 6 is satisfied, the third reflected light R3 to be reflected at the one-two interface and the fifth reflected light R5 to be reflected at the three-five interface are attenuated due to interference with the incident lights IL. For the incident light IL, since both the one-two interface and the three-five interface form the interfaces from a medium with large refractive index to a medium with small refractive index, the reflection at the both interfaces is a free end reflection and a phase is not deviated either in the third reflected light R3 and the fifth reflected light R5. In short, a phase difference due to reflection does not occur in the third reflected light R3 and the fifth reflected light R5. On the other hand, since a sum of an optical film thickness (in which refractive index is applied to actual physical film thickness) of the third translucent film 23c and an optical film thickness of the second translucent film 23b is only the sum of an integral multiple (mλ/2) of one quarter wavelength (λ/4) and half wavelength, the optical path difference (difference in optical film thickness) in the third reflected light R3 and the fifth reflected light R5 is the sum of an integral multiple (mλ) of half wavelength (λ/2) and one wavelength. That is, if the relation of Equation 6 is satisfied, a phase difference between the third reflected light R3 and the fifth reflected light R5 is 180° and the both lights cancel each other out by the mutual interference. Thus, since the reflection of the incident light IL at the one-two interface or the three-five interface is substantially prohibited by the physical boundary conditions, the transmittance of the incident light IL in the second translucent film 23b and the third translucent film 23c intensifies. In the same manner, the eighth reflected light R8 to be reflected at the one-two interface and the sixth reflected light R6 to be reflected at the three-five interface are attenuated due to interference with the first reflected lights R1. For the first reflected light R1, since both the one-two interface and the three-five interface form the interfaces from a medium with small refractive index to a medium with large refractive index, the reflection at the both interfaces is a fixed end reflection and a phase is deviated at 180° both in the eighth reflected light R8 and the sixth reflected light R6. In short, a phase difference due to reflection does not occur in the eighth reflected light R8 and the sixth reflected light R6. On the other hand, as previously described, if the relation of Equation 6 is satisfied, a phase difference between the eighth reflected light R8 and the sixth reflected light R6 is 180° and the both lights cancel each other out due to mutual interference. Thus, since the reflection of the first reflected light R1 at the one-two interface or the three-five interface is substantially prohibited by physical boundary conditions, the transmittance of the first reflected light R1 in the third translucent film 23c and the second translucent film 23b intensifies.

It is preferable to equalize the refractive index $n_1$ of the first translucent film 23a and the refractive index $n_3$ of the third translucent film 23c, in addition, to equalize the refractive index $n_2$ of the second translucent film 23b and the refractive index $n_4$ of the fourth translucent film 22 in order to further attenuate the unnecessary reflected light (second reflected light R2, fourth reflected light R4, seventh reflected light R7, and ninth reflected light R9). That is, the relation is preferable to be $n_1=n_3$ or $n_2=n_4$. As described above, it is necessary that a phase of the second reflected light R2 and a phase of the fourth reflected light R4 are deviated from each other at 180° in order to attenuate the interferences to the second reflected light R2 and the fourth reflected light R4. However, furthermore, it is desirable that an amplitude of the second reflected light R2 and an amplitude of the fourth reflected light R4 be in the same range. In the same manner, it is necessary that a phase of the seventh reflected light R7 and a phase of the ninth reflected light R9 are deviated from each other at 180° in order to attenuate the interferences to the seventh reflected light R7 and the ninth reflected light R9. Furthermore, it is desirable that an amplitude of the seventh reflected light R7 and an amplitude of the ninth reflected light R9 be in the same range. Next, the matter will be described.

Two waves in which the phases are deviated from each other at π and the amplitudes are the same completely cancel out each other. On the other hand, two waves in which the phases are deviated from each other at π and the amplitudes are different do not completely cancel out each other, but waves with small amplitudes remain. For example, in a case of the second reflected light R2 and the fourth reflected light R4, the second reflected light R2 is stronger than the fourth reflected light R4. Therefore, the fourth reflected light R4 virtually disappears due to interference of the second reflected light R2 from the four-one interface (in opposed substrate 20 rather than four-one interface), and light waves of the components obtained by subtracting the absolute value of the fourth reflected light R4 from the second reflected light R2 remain. The remained light waves are the actual reflected light (referred to as two-four reflected light) from the four-one interface and the two-three interface, the second reflected light R2 and the fourth reflected light R4 are the concepts for describing the two-four reflected light. In the same manner, in a case of the third reflected light R3 and the fifth reflected light R5, the light waves of the components obtained by subtracting the absolute value of the fifth reflected light R5 from the third reflected light R3 are the actual reflected light (referred to as three-five reflected light) of the one-two interface and the three-five interface from the one-two interface (in opposed substrate 20 rather than one-two interface). In addition, in a case of the sixth reflected light R6 and the eighth reflected light R8, the light waves of the components obtained by subtracting the absolute value of the eighth reflected light R8 from the sixth reflected light R6 are the actual reflected light (referred to as six-eight reflected light) of the one-two interface and the three-five interface from the three-five interface (in element substrate 10 rather than three-five interface). In addition, in a case of the seventh reflected light R7 and the ninth reflected light R9, the light waves of the components obtained by subtracting the absolute value of the ninth reflected light R9 from the seventh reflected light R7 are the actual reflected light (referred to as seven-nine reflected light) of the four-one interface and the two-three interface from the two-three interface (in element substrate 10 rather than two-three interface).

The intensity of the two-four reflected light is attenuated so that the intensity of the fourth reflected light R4 approximates to the intensity of the second reflected light R2. The intensity of light is the square of the amplitude. The plurality of the refractive indices of the first translucent film 23a are set to imaginary components $k_1$, the plurality of the refractive indices of the second translucent film 23b are set to imaginary components $k_2$, the plurality of the refractive indices of the third translucent film 23c are set to imaginary components $k_3$, the plurality of the refractive indices of the fourth translucent film 22 are set to imaginary components $k_4$, and the plurality of the refractive indices of the fifth translucent film 24 are set to imaginary components $k_5$. The refractive indices of the first translucent film 23a to the fourth translucent film 22 are $n_1=n_3$ or $n_2=n_4$, and the imaginary components of the plurality of the refractive indices of the first translucent film 23a to the fourth translucent film 22 are $k_1=k_3$ and $k_2=k_4$. In short, the plurality of the refractive indices of the first translucent film 23a and the plurality of the refractive indices of the third translucent film 23c are equalized each other, and the plurality of the refractive indices of the second translucent film 23b and the plurality of the refractive indices of the fourth translucent film 22 are equalized each other. In this manner, the reflectances at the four-one interface and the two-three interface are equalized by Equation 3 and Equation 4. In addition, the second reflected light R2 is attenuated, therefore, the transmittance of the incident light IL at the four-one interface is close to 100%. Furthermore, as will be described later, since the light absorption in the first translucent film 23a is as small as approximately 2% or less and the light absorption in the second translucent film 23b is substantially 0%, the intensity of the fourth reflected light R4 and the intensity of the second reflected light R2 are approximately 98%. In this manner, since the amplitude of the fourth reflected light R4 is close to the amplitude of the second reflected light R2, the second reflected light R2 and the fourth reflected light R4 cancel out each other extremely efficiently and the two-four reflected light is very significantly attenuated. On the same principle, since the amplitude of the ninth reflected light R9 is close to the amplitude of the seventh reflected light R7, the seventh reflected light R7 and the ninth reflected light R9 cancel out extremely efficiently, and the seven-nine reflected light is very significantly attenuated.

In order to equalize the plurality of the refractive indices of the first translucent film 23a and the plurality of the refractive indices of the third translucent film 23c, the films may be used which are formed by the same manufacturing method using the same material as the first translucent film 23a and the third translucent film 23c. In this manner, it is possible to form the first translucent film 23a and the third translucent film 23c by the single film-forming method, and it is also possible to easily manufacture the first translucent film 23a and the third translucent film 23c. In addition, in order to equalize the plurality of the refractive indices of the second translucent film 23b and the plurality of the refractive indices of the fourth translucent film 22, the films may be used which are formed by the same manufacturing method using the same material as the second translucent film 23b and the fourth translucent film 22. Also in this case, it is possible to form the second translucent film 23b and the fourth translucent film 22 by the single film-forming method, and it is possible to easily manufacture the second translucent film 23b and the fourth translucent film 22.

It is preferable to equalize the refractive index $n_1$ of the first translucent film 23a and the refractive index $n_3$ of the third translucent film 23c, in addition, to equalize the refractive index $n_2$ of the second translucent film 23b and the refractive index $n_5$ of the fifth translucent film 24 in order to further attenuate the unnecessary reflected light (third reflected light R3, fifth reflected light R5, sixth reflected light R6, eighth reflected light R8). That is, the relation is preferable to be $n_1=n_3$ or $n_2=n_5$. Furthermore, the imaginary components of the plurality of the refractive indices of the first translucent film 23a, the second translucent film 23b, the third translucent film 23c, and the fifth translucent film 24 are $k_1=k_3$ and $k_2=k_5$. In short, the plurality of the refractive indices of the first translucent film 23a and the plurality of the refractive indices of the third translucent film 23c are equalized each other, and the plurality of the refractive indices of the second translucent film 23b and the plurality of the refractive indices of the fifth translucent film 24 are equalized each other. In this manner, the reflectances at the one-two interface and the three-five interface are equalized by Equation 3 and Equation 4. In addition, the third reflected light R3 is attenuated, therefore, the transmittance of the incident light IL at the one-two interface is close to 100%. Furthermore, as will be described later, since the light absorption in the third translucent film 23c is as small as approximately 2% or less and the light absorption in second translucent film 23b is substantially 0%, the intensity of the fifth reflected light R5 and the intensity of the third reflected light R3 are approximately 98%. In this manner, since the amplitude of the fifth reflected light R5 is close to the amplitude of the third reflected light R3, the third reflected light R3 and the fifth reflected light R5 cancel out each other extremely efficiently, and the three-five reflected light is very significantly attenuated. On the same principle, since the amplitude of the eighth reflected light R8 is close to the amplitude of the sixth reflected light R6, the sixth reflected light R6 and the eighth reflected light R8 cancel out extremely efficiently, and the six-eight reflected light is very significantly attenuated.

In order to equalize the plurality of the refractive indices of the second translucent film 23b and the plurality of the refractive indices of the fifth translucent film 24, the films may be used which are formed by the same manufacturing method using the same material as the second translucent film 23b and the fifth translucent film 24. In this manner, it is possible to form the second translucent film 23b and the fifth translucent film 24 by the single film-forming method, and it is also possible to easily manufacture the second translucent film 23b and the fifth translucent film 24. Moreover, m in Equation 5 and m in Equation 6 are not necessarily identical each other, however, as will be described later, m=0 is optimal. In this manner, in a case where m in Equation 5 and m in Equation 6 are identical each other, $n_1 d_1=n_3 d_3$ by Equation 5 and Equation 6. As described above, since it is preferable to be $n_1=n_3$, $d_1=d_3$. That is, in the present embodiment, it is preferable to equalize the plurality of the refractive indices of the first translucent film 23a and the plurality of the refractive indices of the third translucent film 23c as well as to equalize the film thickness $d_1$ of the first translucent film 23a and the film thickness $d_3$ of the third translucent film 23c.

Next, the anti-scattering will be described. It is necessary to attenuate scattering as is possible at respective interfaces in order for the incident light IL or the first reflected light R1 to have high transmittance in the translucent multilayer film 23. If the scattering intensifies at the interface, the transmittance of the incident light IL or the first reflected light R1 attenuates. Furthermore, if the scattering intensifies at the interface, the above-described interference dimming effect also attenuates. On the other hand, the third translucent film 23c functions as a common electrode and is an electrically-conductive polycrystalline film. In the present embodiment, polycrystalline indium tin oxide (ITO) is used as the third translucent film 23c. In addition, as described above, since it is preferable that the same material and the same thickness be used for the first translucent film 23a and the third translucent film 23c, in the present embodiment, the first translucent film 23a is the polycrystalline indium tin oxide (ITO). Small unevenness is generated at the interfaces (one-two interface and three-five interface) due to the presence of grain boundaries or the like in such a polycrystalline film. The small unevenness is unavoidable, but the roughness of the two-three interfaces by the influence of the one-two interface and the increase in the surface roughness of the three-five surface due to the rough surface of two-three interface by the influence of the one-two interface can be avoided. For this reason, as for the second translucent film 23b, a silicon oxide film such as a silicon oxide film containing phosphorus (phosphor-silicate glass, referred to as PSG), or a silicon oxide film containing boron (Boro-silicate glass, referred to as BSG), or a silicon oxide film containing boron and phosphorus (Boro-phospho silicate glass, referred to as BPSG) is used. The silicon oxide films containing the additives are formed by an ordinary pressure CVD method or a plasma CVD method or the like which uses silane gas ($SiH_4$), dichlorodesilane ($SiCl_2H_2$), tetraethoxysilane/tetraethyl ortho silicate/Si ($OC_2H_5)_4$ (TEOS), tetraethyl boat rate (TEB), tetra-methyl-oxy voss rate (TMOP), and the like. In the present embodiment, the BPSG film is used as the second translucent film 23b. Since the silicon oxide films containing the additives have excellent flatnesses, even if the small unevenness is generated at the one-two interface, the two-three interface can be flattened without the delivery of small unevenness to the two-three interface. In this manner, since the light scattering at the two-three interface is attenuated, as a result, the second reflected light R2 and the fourth reflected light R4 effectively cancel out each other, and at the same time, the seventh reflected light R7 and the ninth reflected light R9 effectively cancel out each other. In addition, since the light scattering at the two-three interface is attenuated, the transmittance of the incident light IL at the two-three interface intensifies, and at the same time, the transmittance of the first reflected light R1 at the two-three interface also intensifies. Moreover, as described above, since it is preferable to form the second translucent film 23b, the fourth translucent film 22, and the fifth translucent film 24 with the same film, in the embodiment, the fourth translucent film 22 and the fifth translucent film 24 are also the BPSG films.

Application Example

FIG. 4 is a view illustrating an application example with respect to the fifth translucent film 24 from the first translucent film 23a.

Next, an application example of the first translucent film 23a to the fifth translucent film 24 will be described with reference to FIG. 4.

Physical quantities of each translucent film and the second substrate are respectively described corresponding to three types of light (blue, green, and red) representing the incident light IL in FIG. 4. The second substrate is quartz glass, of which the refractive index thereof is smaller than that of the second translucent film 23b (BPSG), the fourth translucent film 22 (BPSG), or the fifth translucent film 24 (BPSG). The imaginary components of the plurality of the refractive indices of the second translucent film 23b, the fourth translucent film 22, or the fifth translucent film 24 are substantially zero and transparent. The refractive indices of the first translucent film 23a (ITO) and the third translucent film 23c (ITO) are larger than the refractive index of the second translucent film 23b, or the fourth translucent film 22, or the fifth translucent film 24. The imaginary components of the plurality of the refractive indices of the first translucent film 23a and the third translucent film 23c are not zero and light is slightly absorbed in the films. The absorption coefficients of the first translucent film 23a and the third translucent film 23c are in order of $10^{-5}$ ($nm^{-1}$) to $10^{-4}$ ($nm^{-1}$), but the transmittances in the first translucent film 23a and the third translucent film 23c are generally 98% or more by forming the first translucent film 23a and the third translucent film 23c into the thin films. The thickness of the second translucent film 23b is changed according to m, and is determined by Equation 5 or Equation 6 according to the thickness of the first translucent film 23a or the third translucent film 23c.

Film Thickness

Figure 5:
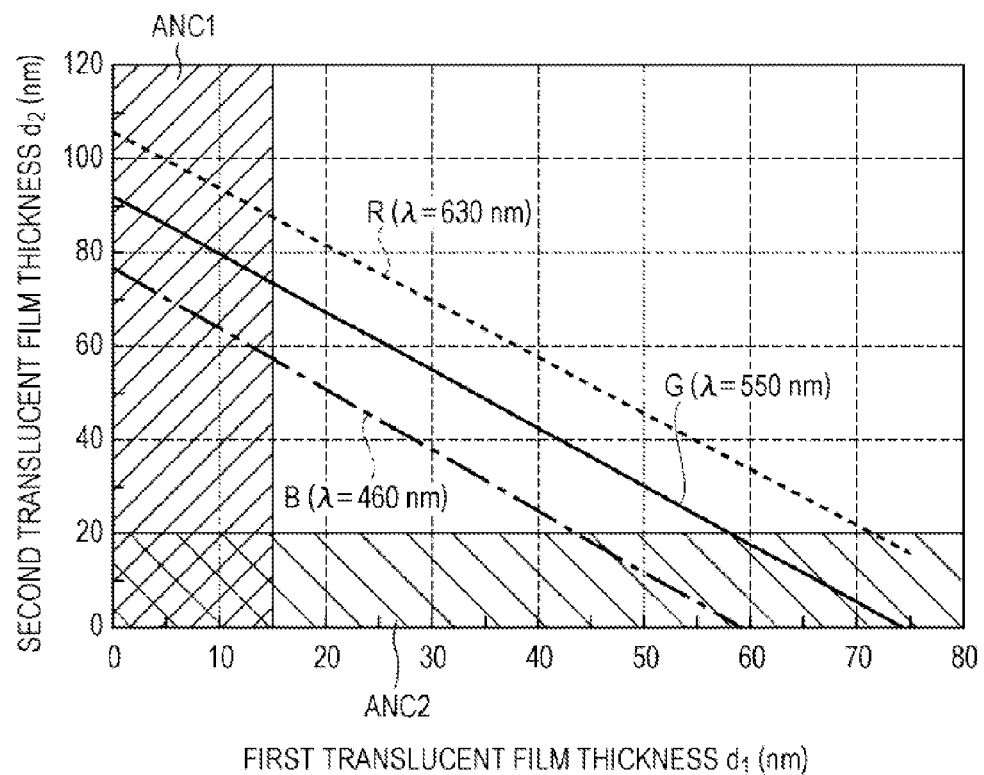
FIG. 5 is a view illustrating a relation between a thickness of the first translucent film and a thickness of a second translucent film.
Figure 6:
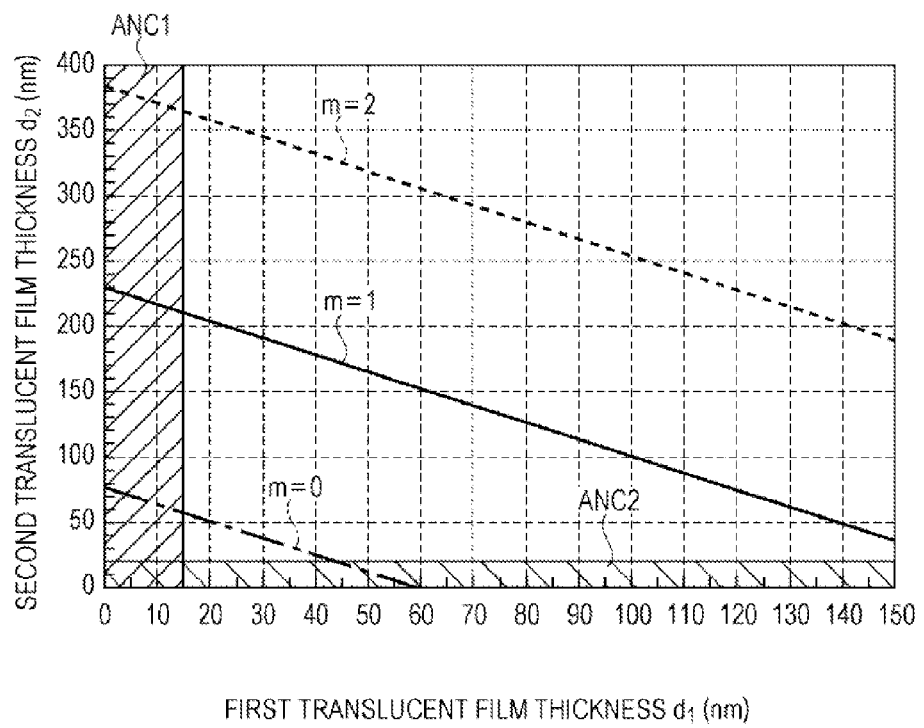
FIG. 6 is a view illustrating the relation between the thickness of the first translucent film and the thickness of the second translucent film.

FIG. 5 illustrates a relation between the thickness of the first translucent film (third translucent film) and the thickness of the second translucent film depending on the light representing the incident light. In addition, FIG. 6 illustrates the relation between the thickness of the first translucent film (third translucent film) and the thickness of the second translucent film depending on m. Next, the preferable film thicknesses of the first translucent film 23a (third translucent film 23c) and the second translucent film 23b will be described with reference to FIGS. 5 and 6. In addition, in FIGS. 5 and 6 although the horizontal axis indicates the value of the first translucent film 23a, the same graph is achieved when the horizontal axis indicates the value of the third translucent film 23c, and thus the horizontal axis of FIGS. 5 and 6 indicates the value of the first translucent film 23a representing the first translucent film 23a and the third translucent film 23c.

FIG. 5 illustrates a relation between the thickness of the first translucent film 23a (third translucent film 23c) and the thickness of the second translucent film 23b depending on the light representing the incident light IL when m=0. Since the first translucent film 23a or the third translucent film 23c satisfies the relation between Equation 5 and Equation 6, the thickness of the first translucent film 23a (third translucent film 23c) and the thickness of the second translucent film 23b become a linear relation depending on the wavelength of the light representing the incident light IL.

First, it is preferable to minimize the light absorption in the first translucent film 23a and the third translucent film 23c and then to make the first translucent film 23a and the third translucent film 23c, in which the absorption coefficients are not zero, as thin as possible in order to increase the effect of the interference dimming. The first translucent film 23a and the third translucent film 23c form ITO using the physical gas phase sedimentation method such as the sputtering method, but the thicknesses thereof are required to be 15 nm or more in order to stably manufacture a film. That is, the first translucent film 23a (third translucent film 23c) having less than 15 nm thickness becomes a region (first uncontrolled region ANC1) in which the film quality and the thickness are not easily controlled. In other words, if the thickness of the first translucent film 23a (third translucent film 23c) is 15 nm or more, the film quality and the thickness can be controlled. In the same manner, the second translucent film 23b forms BPSG using the physical gas phase sedimentation method such as an atmospheric pressure CVD method, but the thickness thereof is required to be 20 nm or more in order to stably manufacture a film. That is, the second translucent film 23b having less than 20 nm thickness becomes a region (second uncontrolled region ANC2) in which the film and the thickness are not easily controlled. In other words, if the thickness of the second translucent film 23b is 20 nm or more, the film quality and the thickness can be controlled. The first translucent film 23a (third translucent film 23c) and the second translucent film 23b need to satisfy the linear relation of Equation 5 (Equation 6) even in the region which is neither a first uncontrolled region ANC1 nor the second uncontrolled region ANC2.

As illustrated in FIG. 5, for example, if the light representing the incident light IL is blue B, a preferable range of the film thicknesses of the first translucent film 23a and the third translucent film 23c is 15 nm to 44 nm, and a preferable median value of the range of the film thicknesses is 29 nm. At that time, a preferable range of the film thickness of the second translucent film 23b is 20 nm to 57 nm, and a preferable median value of the range of the film thicknesses is 39 nm. In the same manner, if the light representing the incident light IL is green G, a preferable range of the film thicknesses of the first translucent film 23a and the third translucent film 23c is 15 nm to 58 nm, and a preferable median value of the range of the film thicknesses is 37 nm. At that time, a preferable range of the film thickness of the second translucent film 23b is 20 nm to 73 nm, and a preferable median value of the range of the film thicknesses is 47 nm. Furthermore, if the light representing the incident light IL is red R, a preferable range of the film thicknesses of the first translucent film 23a and the third translucent film 23c is 15 nm to 71 nm, and a preferable median value of the range of the film thicknesses is 43 nm. At that time, a preferable range of the film thickness of the second translucent film 23b is 20 nm to 88 nm, and a preferable median value of the range of the film thicknesses is 54 nm.

As described above, the thickness of each translucent film may be optimally set for each electro-optic device depending on the light representing the incident light IL, but the thicknesses of some translucent films may be set in common using various electro-optic devices. For example, the thickness of the second translucent film 23b may be changed between the electro-optic devices by equalizing the physical film thicknesses of the first translucent film 23a and the third translucent film 23c using the various electro-optic devices regardless of the wavelength of the light representing the incident light IL. Also in that case, Equation 5 or Equation 6 is satisfied. As a projection-type display device 1000 (refer to FIG. 7) to be described later, in a case where an electronic apparatus uses a plurality of types of electro-optic devices, the physical film thickness of the second translucent film 23b may be adjusted with respect to other types of the electro-optic devices (e.g., liquid crystal light valve 1250 for red light R or liquid crystal light valve 1260 for green light G, refer to FIG. 7) in the short-wavelength-region electro-optic devices (e.g., liquid crystal light valve 1270 for blue light B, refer to FIG. 7) that modulates the light of a short wavelength region. In this case, the physical film thicknesses of the first translucent film 23a and the third translucent film 23c are equalized in the liquid crystal light valve 1270 for the blue light B, the liquid crystal light valve 1250 for red light R, the liquid crystal light valve 1260 for the green light G, and the physical film thicknesses of the second translucent film 23b is different in the liquid crystal light valve 1270 for the blue light B. In this manner, when the electronic apparatus uses the plurality of types of electro-optic devices (when electronic apparatus includes at least first electro-optic device and second electro-optic device), the physical film thicknesses of the first translucent film 23a and the third translucent film 23c are equalized using the plurality of types of electro-optic devices (using first electro-optic device and second electro-optic device). In addition, the physical thickness of the second translucent film 23b of one type of electro-optic device (first electro-optic device) may be different from the physical thickness of the second translucent film 23b of the other type of electro-optic device (second electro-optic device). In this manner, it is possible to efficiently manufacture the plurality of types of the electro-optic devices, and at the same time, it is possible to attenuate the unnecessary reflected light (second reflected light R2 to fifth reflected light R5 and sixth reflected light R6 to ninth reflected light R9) as is possible.

If m in Equation 5 or Equation 6 is an integer larger than or equal to 0, any number is good, but 0 is optimal. Next, the matter will be described. The light representing the incident light IL is considered as blue B in FIG. 6, however, as illustrated in FIG. 6, in general, according to the matter that m becomes larger from 0 to 1 and 2, a range of the values capable of being acquired by the thickness of the first translucent film 23a or the third translucent film 23c and the thickness of the second translucent film 23b intensifies. On the other hand, as described above, it is preferable to make the first translucent film 23a and the third translucent film 23c as small as possible from the viewpoint of minimizing the light absorption. As illustrated in FIG. 4, for example, if the light representing the incident light IL is considered as blue B and the thicknesses of the first translucent film 23a and the third translucent film 23c are set to 29 nm, the thickness of the second translucent film 23b is 39 nm using n=0, 192 nm using m=1, and 346 nm using m=2. In this manner, the larger the value of m, the thicker the second translucent film 23b. The second translucent film 23b is formed by the gas phase sedimentation method, however, approximately a several percent (specifically, approximately 2% to approximately 5%) of variation in the film thickness during the sedimentation is usually observed within the surface of the second substrate. In a case where m=0, since the thickness of the second translucent film 23b is 39 nm, a variation in the film thickness of the second translucent film 23b within the surface of the second substrate is approximately 0.8 nm to approximately 2.0 nm at the maximum. In such a variation in the film thickness, the variation in the film thickness has little adverse effect on the effect of the dimming. In contrast, in a case where m=2, since the thickness of the second translucent film 23b is 346 nm, a variation in the film thickness of the second translucent film 23b within the surface of the second substrate is approximately 7 nm to approximately 17 nm. If the light representing the incident light IL is blue B, as illustrated in FIG. 4, since the refractive index of the second translucent film 23b is 1.498, a variation in the optical film thickness of the second translucent film 23b is approximately 11 nm to approximately 26 nm. A variation of the optical film thickness 26 nm causes a phase difference variation of approximately 6%, and the effect of the interference dimming is likely to be partly damaged. For this reason, it is preferable to thin the second translucent film 23b, and m=0 is optimal.

Method of Manufacturing the Same

The method of manufacturing the first translucent film 23a to the fifth translucent film 24 will be described with reference to FIG. 3.

A BPSG film is formed on the quartz glass which is an opposed substrate 20 at a substrate temperature of approximately 400° C. using an atmospheric pressure CVD apparatus reacted with ozone and TEOS. The BPSG film is the fourth translucent film 22. Content of boron and phosphorus contained in the BPSG film forming the fourth translucent film 22 forms a film so as to be in the range of 1% by weight to 5% by weight. The BPSG film has liquidity during the film formation by setting the boron content and the phosphorus content to this range. Thus, it is possible to form a film having excellent flatness even in an as-deposited state. The fourth translucent film 22 has a film thickness which is thick enough to be able to smooth the surface unevenness generated by forming the parting portion 21 on the opposed substrate 20. Specifically, the film thickness is approximately 300 nm. Moreover, since the film is formed at 500 nm to 1000 nm, a flattening process such as chemical mechanical polishing and the like may be performed until the film thickness becomes approximately 300 nm. According to this, a flatter formation surface can be obtained. In addition, since the BPSG film has excellent moisture absorbency and prevents unnecessary moisture or gas thereof from spreading into the liquid crystal layer 50. As a result, the moisture resistance of the liquid crystal apparatus 100 can be improved.

Next, ITO, which is the first translucent film 23a, is formed by the sputtering method.

Next, a second BPSG film is formed on ITO, which is the first translucent film 23a. The second BPSG film is the second translucent film 23b. The manufacturing conditions are the same as BPSG forming the fourth translucent film 22 except for the sedimentation time.

Next, ITO, which is the third translucent film 23c, is formed by the sputtering. The manufacturing conditions are to be exactly the same as ITO, which is the first translucent film 23a, including the sedimentation time. If the relation between Equation 5 and Equation 6 is not satisfied, the first translucent film 23a and the third translucent film 23c do not need to be the same. However, if the first translucent film 23a and the third translucent film 23c are the same, the manufacturing process significantly is simplified, and the management of the thickness or refractive index is also simplified. If the first translucent film 23a and the third translucent film 23c are changed each other, the management becomes difficult. For example, a case where the refractive index of the first translucent film 23a is set to 1.9 and the refractive index of the third translucent film 23c is set to 2.1 is considered. In this case, the thickness of the second translucent film 23b is set to 29 nm. In addition, if the light representing the incident light IL is considered as blue B, the thickness of the first translucent film 23a is 30 nm and the thickness of the third translucent film 23c is 28 nm. In this manner, if the first translucent film 23a and the third translucent film 23c are formed in different films, since the first translucent film 23a and the third translucent film 23c should be formed separately in a slight difference in the film thickness of only 2 nm, a stabilized manufacturing becomes difficult. In contrast, if the first translucent film 23a and the third translucent film 23c are formed in the same film and at the same thickness, since the same manufacturing process may be simply performed, the manufacturing process is significantly simplified.

Next, on ITO, which is the third translucent film 23c, a third BPSG film is formed. The third BPSG film is the fifth translucent film 24. The manufacturing conditions are the same as BPSG forming the fourth translucent film 22 except for the sedimentation time. The film thickness of the fifth translucent film 24 is approximately 100 nm. Moreover, the fifth translucent film 24 is patterned so as not to cover the upper and lower conductive portion 106 illustrated in FIG. 1. Then, the alignment layer 25 is formed by forming an inorganic material such as silicon oxide (SiOx) using the physical gas phase sedimentation method (oblique vapor deposition method or oblique sputtering method) in the same manner as the alignment layer 18 of the element substrate 10. The film thickness of the alignment layer 25 is approximately 75 nm.

Electronic Apparatus

Figure 7:
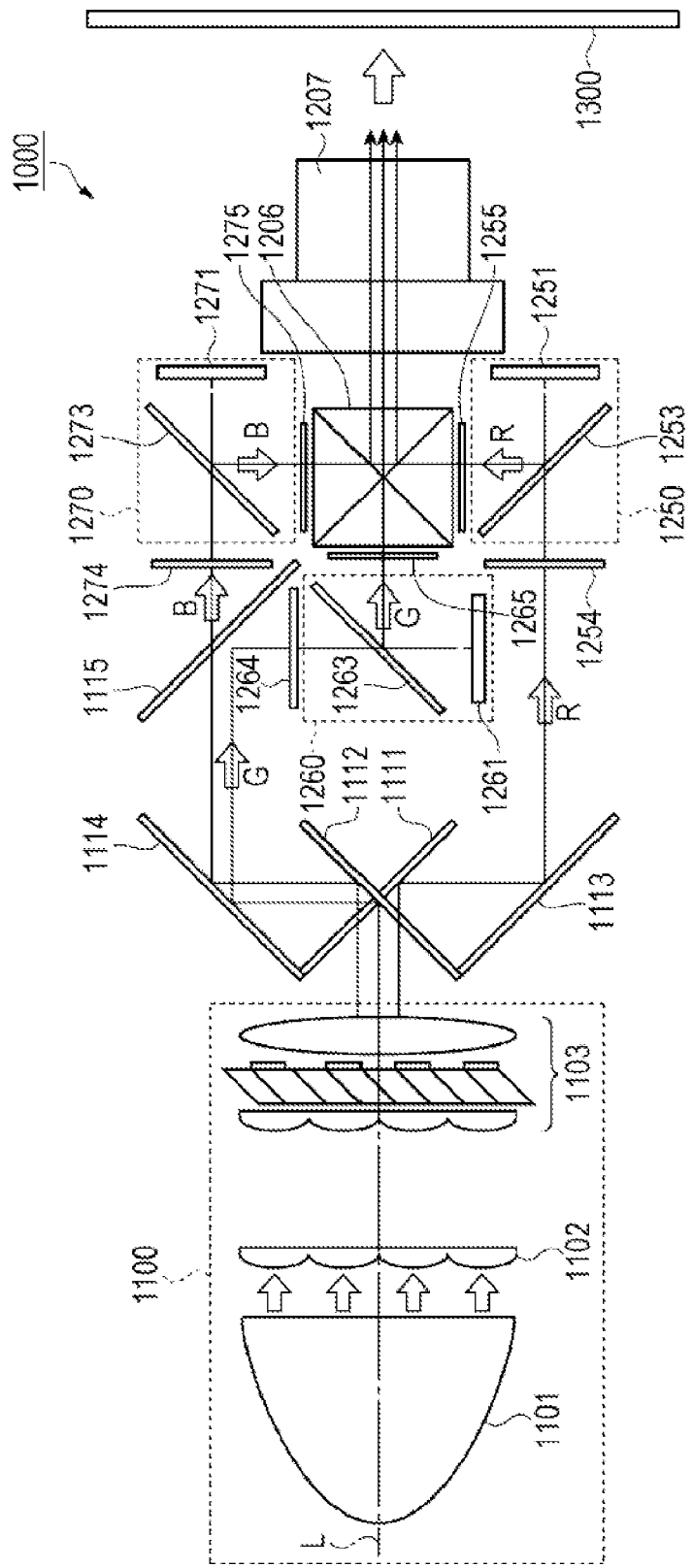
FIG. 7 is a schematic view illustrating a configuration of a projection-type display device as an electronic apparatus.

FIG. 7 is a schematic view illustrating a configuration of a projection-type display device as an electronic apparatus. Next, the electronic apparatus of the present embodiment will be described with reference to FIG. 7.

As illustrated in FIG. 7, the projection-type display device 1000 as the electronic apparatus of the present embodiment has a polarizing illumination apparatus 1100 disposed along a system optical axis L, three dichroic mirrors, which are 1111, 1112, and 1115, two reflection mirrors, which are 1113 and 1114, three reflection-type liquid crystal light valves, which are 1250, 1260, and 1270, as light modulation elements, a cross dichroic prism 1206, and a projection lens 1207.

The polarizing illumination apparatus 1100 is schematically configured of a lamp unit 1101 as a light source configured to have a white light source such as a halogen lamp, an integrator lens 1102, and a polarizing conversion element 1103.

Polarization light fluxes emitted from the polarizing illumination apparatus 1100 are incident on the dichroic mirror 1111 and the dichroic mirror 1112 disposed to be orthogonal to each other. The dichroic mirror 1111 as a light separation element reflects the red light R of the incident polarizing light fluxes. In addition, the dichroic mirror 1112 as one light separation element reflects the green light G and the blue light B of the incident polarizing light fluxes.

The reflected red light R is re-reflected by the reflection mirror 1113 and is incident on the liquid crystal light valve 1250. On the other hand, the reflected green light G and the blue light B are re-reflected by the reflection mirror 1114 and are incident on the dichroic mirror 1115 as the light separation elements. The dichroic mirror 1115 reflects the green light G and passes through the blue light B. The reflected green light G is incident on the liquid crystal light valve 1260. The passed-through blue light B is incident on the liquid crystal light valve 1270.

The liquid crystal light valve 1250 has a reflection-type liquid crystal panel 1251 and a wire grid polarizing plate 1253 as a reflection-type polarizing element. The liquid crystal light valve 1250 is disposed so that the red light R reflected by the polarizing plate 1253 is perpendicularly incident on the incident surface of the cross dichroic prism 1206. In addition, an auxiliary polarizing plate 1254 compensating for a polarization degree of the wire grid polarizing plate 1253 is disposed on the incident side of the red light R in the liquid crystal light valve 1250, and another auxiliary polarizing plate 1255 is disposed along the incident surface of the cross dichroic prism 1206 in the exit side of the red light R. Moreover, in a case of a polarizing beam splitter is used as a reflection-type polarizing element, a pair of auxiliary polarizing plates 1254 and 1255 can be omitted. The configuration of such a reflection-type liquid crystal light valve 1250 and the disposition of each configuration are the same also in the reflection-type liquid crystal light valves 1260 and 1270.

Each color light incident on the liquid crystal light valve 1250, 1260, and 1270 is modulated based on mage information and is incident again on the cross dichroic prism 1206 via the wire grid polarizing plates 1253, 1263, and 1273. In the cross dichroic prism 1206, each color light is combined, the combined light is projected on a screen 1300 by the projection lens 1207, and then an image is enlarged to be displayed.

The above-described reflection-type liquid crystal apparatus 100 is applied to the present embodiment as the reflection-type liquid crystal panels 1251, 1261, and 1271 in the liquid crystal light valves 1250, 1260, and 1270.

According to such a projection-type display device 1000, since the reflection-type liquid crystal apparatus 100 is used in the liquid crystal light valves 1250, 1260, and 1270, it is possible to provide the reflection-type projection-type display device 1000 in which a bright image can be projected and fast-driving is available.

As described above, the unnecessary reflected light (second reflected light R2 to fifth reflected light R5 and sixth reflected light R6 to ninth reflected light R9) can be attenuated and the transmittance of the incident light IL or the first reflected light R1 can be intensified by applying the three methods of the refractive index matching, the interference dimming, and the anti-scattering using the electro-optic device of the present embodiment. As a result, since the second reflected light R2 to the fifth reflected light R5 are attenuated during the dark display, the reflectance during the dark display can be attenuated. Furthermore, since the transmittance of the incident light IL is improved and the sixth reflected light R6 to ninth reflected light R9 are attenuated during the bright display, the reflectance during the bright display can be intensified. That is, the reflectance during the bright display is improved, and at the same time, the reflectance during the dark display may be reduced. Thus, the electro-optic device forming an image having high contrast ratio may be realized. In addition, since the second reflected light R2 to the fifth reflected light R5 are attenuated, the interference of the reflected light and the first reflected light R1 is also reduced. The interference of the second reflected light R2 to the fifth reflected light R5 and the first reflected light R1 causes a display defect called ripple, however, the ripple is significantly attenuated using the electro-optic device of the present embodiment since the second reflected light R2 to the fifth reflected light R5 are very weak.

The present invention is not limited to the above-described embodiment, but can be modified and changed in various forms without departing from the concept of the present invention. In addition, an electro-optic device associated with such changes or and electronic apparatus applying the electro-optic device are also included in the technical scope of the present invention. Various modifications can be considered in addition to the above-described embodiment. Hereinafter, Modification Examples will be described.

Modification Example 1

The electro-optic device to which the invention is applied is not limited to the reflection type is also applicable to the transmission type. In a case of the transmission-type electro-optic device, the pixel electrode 15 becomes a transparent conductive film, and a light source such as a backlight and the like, is disposed on the back surface of the element substrate 10 or the back surface of the opposed substrate 20. In a case where the light source is disposed on the surface of the element substrate 10, since the first reflected light R1 of FIG. 3 corresponds to the incident light of the light source and the sixth reflected light R6 to the ninth reflected light R9 are reduced, a bright display is luminous. In addition, in a case where the light source is disposed on the back surface of the opposed substrate 20, the second reflected light R2 to the fifth reflected light R5 are reduced, the bright display is luminous.

Modification Example 2

Alignment control of the liquid crystal molecules in the liquid crystal layer 50 of the electro-optic device to which the invention is applied is not limited to a vertical alignment (VA) and is also applicable to twisted nematic (TN) or optically compensated bend (OCB) or the like.

Modification Example 3

The electro-optic device to which the invention is applied is not limited to the liquid crystal apparatus 100 and is generally applicable to the electro-optic device having a transparent conductive film (third translucent film 23c) on the opposed substrate 20, for example, is applicable to an electrophoretic display device having an electrophoretic material instead of the liquid crystal layer 50 as an electro-optical layer.

Modification Example 4

The electronic apparatus to which the electro-optic device of the embodiment can be applied is not limited to the projection-type display device 1000 of the embodiment, for example, can be appropriately used as a display unit of an information terminal equipment such as a projection-type head-up display (HUD), a direct-type head-mounting display (HMD), an e-book, a personal computer digital still camera, a LCD TV, a viewfinder type, a monitor-direct-type video recorder, a car navigation system, an electronic organizer, and POS.

The entire disclosure of Japanese Patent Application No. 2012-243328, filed Nov. 5, 2012 is expressly incorporated by reference herein.

What is claimed is:

1. An electro-optic device comprising:
   a first substrate;
   a second substrate;
   an electro-optic layer which is interposed between the second substrate and the first substrate; and
   a first translucent film, a second translucent film, and a third translucent film which are disposed between the second substrate and the electro-optic layer and are sequentially formed from the second substrate,
   wherein the refractive index of the second translucent film is larger than the refractive index of the second substrate, is smaller than the refractive index of the first translucent film, and is smaller than the third translucent film.

2. The electro-optic device according to claim 1 further comprising:
   a fourth translucent film between the second substrate and the first translucent film,
   wherein the refractive index of the fourth translucent film is larger than the refractive index of the second substrate and is smaller than the refractive index of the first translucent film.

3. The electro-optic device according to claim 2,
   wherein the refractive index of the first translucent film and the refractive index of the third translucent film are substantially are the same, and the refractive index of the second translucent film and the refractive index of the fourth translucent film.

4. The electro-optic device according to claim 1 further comprising;
   a fifth translucent film on the third translucent film,
   wherein the refractive index of the fifth translucent film is larger than the refractive index of the second substrate and is smaller than the refractive index of the third translucent film.

5. The electro-optic device according to claim 4,
   wherein the refractive index of the first translucent film and the refractive index of the third translucent film are substantially the same, and the refractive index of the second translucent film and the refractive index of the fifth translucent film are substantially the same.

6. The electro-optic device according to claim 1,
   wherein the second translucent film is a silicon oxide film containing boron and phosphorus.

7. The electro-optic device according to claim 1,
   wherein the third translucent film is electrically conductive.

8. An electronic apparatus comprising:
   the electro-optic device according to claim 1.

* * * * *